United States Patent [19]
Kishimoto et al.

[11] 3,857,368
[45] Dec. 31, 1974

[54] IGNITION SYSTEM OF ROTARY PISTON ENGINE

[75] Inventors: Kyuji Kishimoto; Hiraki Sawada, both of Tokyo, Japan

[73] Assignee: Nissan Motor Company, Limited, Yokohama City, Japan

[22] Filed: Mar. 30, 1973

[21] Appl. No.: 346,318

[30] Foreign Application Priority Data
Mar. 31, 1972 Japan.............................. 47-38208
Mar. 31, 1972 Japan.............................. 47-38209

[52] U.S. Cl........................... 123/8.09, 123/148 DS
[51] Int. Cl............................................. F02b 53/12
[58] Field of Search............ 123/8.09, 148 DS, 8.01

[56] References Cited
UNITED STATES PATENTS
3,584,608   6/1971   Shibagaki.......................... 123/8.09
3,716,991   2/1973   Tatsutomi..................... 123/148 DS
3,752,128   8/1973   Tatsutomi.......................... 123/8.09

*Primary Examiner*—Clarence R. Gordon

[57] ABSTRACT

An ignition system for a rotary piston engine adapted to effect intermittent ignition for preventing uneven running condition of the engine during engine braking. The ignition system includes a switching arrangement which is operative to de-energize the spark plug in cycles which are so predetermined as to cause the misignition in every second combustion stroke in response to predetermined conditions representative of engine braking condition.

5 Claims, 3 Drawing Figures

IGNITION SYSTEM OF ROTARY PISTON ENGINE

The present invention relates to rotary piston internal combustion engines and, more particularly, to an ignition system of a rotary piston internal combustion engine.

It has been known in the art that the rotary piston internal combustion engine tends to operate unevenly or unsteadily during engine braking condition in which the pressures in the working spaces of the combustion chamber are reduced to extremely low levels due to the suction which is developed in the intake manifold of the engine. This uneven or unsteady operation of the rotary piston engine is accounted for by the fact that the exhaust gases being discharged into the exhaust port of the engine from a discharge space of the combustion chamber in one operational cycle of the engine cylinder partially overflow at the overlap dead center point into the suction space in the subsequent operational cycle of the cylinder. The exhaust gases thus reaching the suction space of the combustion chamber are admixed to the combustible mixture of air and fuel entering the space from the intake port of the engine and bring about the reduction of the concentration of fresh air in the mixture. The mixture therefore tends to fail to be properly ignited and burned during the combustion stroke. Once the misfiring of the mixture is thus invited, the discharge space ensueing from the particular combustion space is occupied with the unburned combustible mixture of air and fuel so that fresh air is contained in an increased proportion in the combustible mixture in the suction space in the subsequent operational cycle of the engine cylinder. The mixture is thus assuredly ignited and burned during the combustion stroke of the cycle which is subsequent to the misfiring cycle.

The rotary piston internal combustion engine thus generally has a tendency in which each of the working spaces of the combustion chamber is subject to misfiring in every second operational cycle of the engine cylinder. If, for instance, the rotary piston internal combustion engine using the three-flank rotor and the two-lobe epitrochoidal rotor housing is taken into account, the misfiring is invited in each of the three working spaces of the combustion chamber during every second operational cycle of the engine cylinder or for every second full turn of the rotor within the combustion chamber. In this instance the misfiring will take place in the rotary piston engine of the particular character in three different operational patterns which consists of:

Pattern a: The misfiring takes place in the three successive working spaces of the combustion chamber during one operational cycle of the engine cylinder and the proper firing of the combustible mixture is achieved in the three successive working spaces during the subsequent operational cycles.

Pattern b: The misfiring takes place in the two trailing or posterior working spaces of the combustion chamber in one operational cycle of the engine cylinder and in the leading or foremost working space in the subsequent cycle.

Pattern c: The misfiring takes place in the trailing or rearmost working space in one cycle and the two leading or anterior working spaces in the subsequent cycle.

In any of these operational patterns, the misfiring is invited in the three successive working spaces of the combustion chamber and the proper firing is achieved in the three successive working spaces subsequent to the former three working spaces throughout the operational cycles of the engine cylinder during the engine braking condition.

When the firing and misfiring are repeated in a cyclical fashion, then sizable fluctuations result in the engine torque and, in a motor vehicle incorporating the rotary piston internal combustion engine, the fluctuations in the engine torque tend to be combined with the proper vibrations of the vehicle and give rise to a cause of the so-called car-bucking phenomenon.

The present invention aims at prevention of the car-bucking by causing the firing and misfiring alternately in the engine cylinder throughout the operational cycles of the cylinder during the engine braking condition of the rotary piston internal combustion chamber. To achieve this end, the present invention proposes to arrange the ignition system of the rotary piston engine in such a manner that the spark plug is energized in synchronism with every second combustion stroke in response to predetermined operational conditions of the engine during the engine braking condition.

It is, therefore an important object of the present invention to provide a rotary piston internal combustion engine with an ignition system adapted to enable the engine to operate in a streamlined manner during engine braking condition.

It is another important object of the invention to provide a rotary piston internal combustion engine having an ignition system capable of preventing the misfiring of the combustible mixture from occuring in successive combustion strokes in the combustion chamber of the engine during the engine braking condition.

It is still another important object of the present invention to provide a rotary piston internal combustion engine having an improved ignition system in which the spark plug is energized in a manner that the combustible mixture is fired and misfired alternately throughout the consecutive combustion strokes during the engine braking condition.

As will be apparently understood as the description proceeds, these objects of the present invention are basically accomplished through incorporation in the rotary piston internal combustion engine an ignition system which comprises an ignition coil having a primary winding connected at one end to a d.c. power source and a secondary coil connected to a spark plug of an engine cylinder, first and second switch means which are connected in series with the other end of the primary winding of the coil, driving means for opening and closing the first and second switch means in cycles which are related to cycles of operation of the engine for energizing the spark plug in response to the cyclical opening of the first and second switch means, and short-circuit means responsive to predetermined operational conditions substantially representative of engine braking condition for short-circuiting the first switch means to ground when the first switch means closes and constantly connecting the second switch means to ground in response to the aforementioned predetermined conditions so that the spark plug is energized in response to the cyclical opening of the first switch means and de-energized in response to the cyclical closing of the first switch means regardless of the cyclical opening of the second switch means. The short-circuit means may comprise a control unit which is responsive to the conditions substantially representative of the engine braking condition. This condition may include an angular position of the carburetor throttle valve of the engine or a vacuum obtaining in the intake manifold during the engine braking condition and an engine speed higher than a predetermined level.

Other features and advantages of the ignition system of the rotary piston internal combustion engine according to the present invention will become apparent from the following description taken in conjunction with the accompanying drawings, in which.

Figure 1:
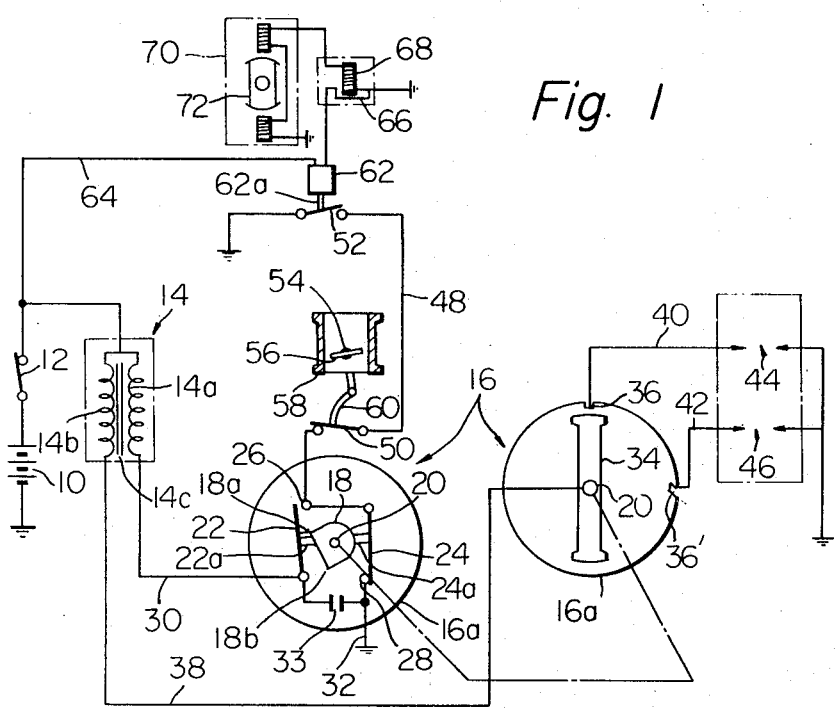
FIG. 1 is a schematic view showing a preferred embodiment of the ignition system according to the present invention.
Figure 3:
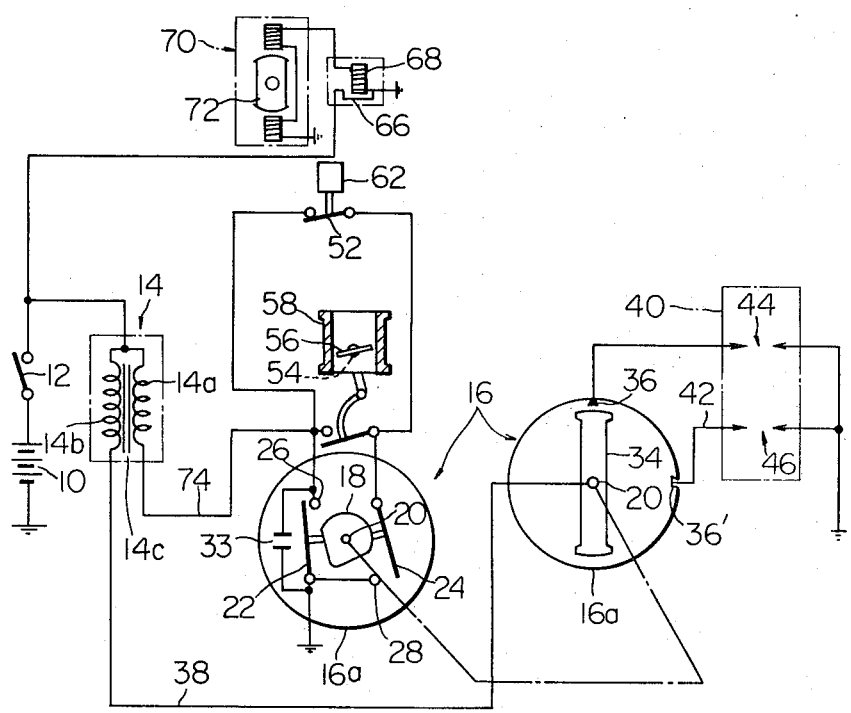
FIG. 3 is a view similar to FIG. 1 but shows another preferred embodiment of the ignition system according to the present invention.

In each of FIGS. 1 and 3, the ignition system according to the present invention is assumed, by way of example, as being incorporated in a rotary piston internal combustion engine having two engine cylinders. This however, is merely for illustrative purposes and, as such, it should be borne in mind that the ignition system herein proposed can be in essence applicable to the rotary piston internal combustion engines incorporating only one or more than two engine cylinders. The constructions and operations of the rotary piston internal combustion engines presently in common use are well known to the person skilled in the art and are rather immaterial for the understanding of the present invention and accordingly, will not be described herein.

Referring now to the drawings, first to FIG. 1, the ignition system according to the present invention comprises, as customary, a d.c. power source of battery 10 which has a negative terminal connected to ground and a positive terminal connected across an ignition switch 12 to an ignition coil 14. The ignition coil 14 has primary and secondary windings 14a and 14b, respectively, which are wound on a core 14c of soft iron for stepping up the low primary voltage as received from the d.c. power source 10 in a usual manner.

An ignition distributor assembly, generally designated by reference numeral 16, has a cam 18 having two angularly spaced enlarged cam lobes 18a and 18b. In the example of the cam 18 herein shown, the cam lobes 18a and 18b are 90° spaced apart from each other around a center of the cam 18. The cam 18 is rotatable with a shaft 20 which is adapted to be driven to rotate at a speed which is one-half of an output shaft (not shown) of the engine. First and second movable breaker plates 22 and 24, respectively, are positioned substantially in diametrically opposed relation across the cam 18 and have cam follower elements 22a and 24a, respectively, which are constantly in abutting engagement with the cam 18. The movable breaker plates 22 and 24 are thus moved toward and away from the shaft 20 of the cam 18 as the cam is driven to rotate about the shaft. First and second stationary contact points 26 and 28 are located adjacent the first and second breaker plates 22 and 24, respectively, so that the breaker plates 22 and 24 are brought into contact with the contact points 26 and 28, respectively, as the cam 18 rotates about the shaft 20. More specifically, each of the breaker plates 22 and 24 are caused to move away from the associated stationary contact point 26 and 28 when the cam 18 is in engagement with the cam follower element 22a or 24a of the breaker plate through its enlarged cam lobe 18a or 18b.

The first movable breaker plate 22 is constantly connected through a line 30 to the primary winding 14a of the ignition coil 14 while the second movable breaker plate 24 is constantly grounded through a line 32. The second breaker plate 24 is constantly connected to the first stationary contact point 26 so that the primary winding 14a of the ignition coil 14 is serially connected to ground through the first breaker plate 22, first contact point 26, second breaker plate 24 and second contact point 28 in this sequence when the two breaker plates 22 and 24 are closed concurrently. A condenser 33 is connected across the breaker plates 22 and 24 and contact points 26 and 28 for preventing arcs to be generated between the breaker plates and contact points when the breaker plates are disconnected from the contact points.

The ignition distributor assembly 16 further comprises a rotary electrode 34 which is rotatably carried on the shaft 20 of the cam 18 and first and second stationary electrodes 36 and 36' which are angularly spaced apart from each other around the shaft 20. In unison with the particular configuration of the cam 18, these stationary electrodes 36 and 36' are herein assumed to be spaced 90° from each other. The rotary electrode 34 is electrically connected at its extreme ends to the stationary electrodes 36 and 36' as it is driven to rotate together with the cam 18 about the shaft 20. The rotary electrode 34 is electrically connected to the secondary winding 14b of the ignition coil 14 through a line 38. The first and second stationary electrodes 36 and 36' are electrically connected through lines 40 and 42 to the spark plugs 44 and 46, respectively, of the two engine cylinders (not shown). The ignition distributor assembly 16 thus comprising the cam 18, shaft 20, movable breaker plates 22 and 24, stationary contact points 26 and 28, rotary electrode 34 and stationary electrodes 36 and 36' are encased within an insulated housing 16a.

Figure 2:
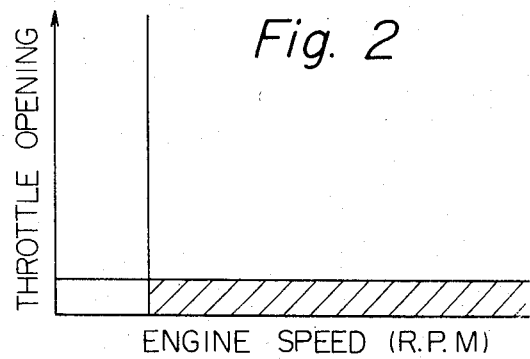
FIG. 2 is a graph indicating an example of the operational range which is to be responded to by the ignition system shown in FIG. 1 during the engine braking condition.

The first stationary contact point 26 is grounded through a line 48 across first and second switches 50 and 52, respectively, which are connected in series with each other as illustrated. The switches 50 and 52 are biased to open by, for example, suitable spring means and are adapted to close in response to appropriate predetermined conditions substantially representative of the engine braking condition with which the shown ignition system is combined. Thus, the first switch 50 is connected to a shaft 54 carrying a throttle valve 56 of a carburetor 58 through a suitable mechanical linkage 60. The mechanical linkages 60 is so designed as to hold the switch 50 open when the carburetor throttle valve 56 is moved to an angular position providing a degree of opening larger than a predetermined value and to move the switch 50 to a closed position in response to a degree of opening smaller than the predetermined value of the throttle valve 56. The second switch 52, on the other hand, is adapted to respond to an engine speed higher than a predetermined limit. For this purpose, a solenoid device 62 has a movable plunger 62a mechanically connected to the switch 50. The solenoid device 62 is adapted to have the plunger 62a biased to its retracted position so that the switch 52 is normally held open and to cause the plunger 62a to project for closing the switch 52 when energized. Thus, the solenoid device 62 has a coil (not shown) which is connected at one terminal to the positive terminal of the d.c. power source 10 through a line 64 across the ignition switch 12 and at the other terminal to a magnetically operated switch 66. The magnetically operated switch 66 is biased by, for example, suitable spring means (not shown) and is caused to close when a magnetic field acting thereon is increased to a predetermined magnitude overcoming the opposing force of the biasing means. The magnetic field is built up by an electromagnet 68 having a coil connected to an output terminal of a magnetic generator which is generally designated by reference numeral 70. The magnetic generator 70 has a rotary armature 72 which is driven from the output shaft (not shown) of the engine for producing an a.c. power having a frequency which is in agreement with the revolution speed of the engine output shaft. In view of the fact that the successive misfiring is invited typically when the engine operates at a speed ranging from 1,200 to 1,500 rpm if the engine is so designed as to operate at about 900 rpm during idling, the magnetically operated switch 66 may preferably be arranged in such a manner as to be closed when the electromagnet 68 is energized from the generator 70 with an a.c. power having a frequency higher than a value which is substantially in correspondence with the engine speed of about 1,200 rpm where the ignition system is to be incorporated in the rotary piston engine adapted to operate at a speed in the neighbourhood of 900 rpm during idling. The range of the operational conditions of the engine in which the first and second switches 50 and 52 are to be closed is indicated by a hatched area in FIG. 2.

It is apparent that the above described arrangements for operating the first and second switches 50 and 52 are herein illustrated merely by way of example and, accordingly, they may be replaced with any suitable alternatives which are adapted in effect to operate the switches 50 and 52 in response to the engine braking condition. Thus, the mechanical linkage 60 interconnecting the switch 50 and the throttle valve 56 of the carburetor 58 may be replaced with a diaphragm-operated actuating means which is responsive to the vacuum developed in the intake manifold of the engine or in a mixture passage downstream of the carburetor throttle valve during idling of the engine. Likewise, the arrangement to control the second switch 52 may make use of the impulses on the ignition coil or of the centrifugal action.

In operation, the cam 18 and the rotary electrode 34 of the ignition distributor assembly 16 are driven from the engine output shaft (not shown) at a speed which is one half of the revolution speed of the engine output shaft as previously mentioned. Since, in this instance, the cam 18 is formed with the two enlarged cam lobes 18a and 18b which are 90° spaced apart from each other, the movable breaker plates 22 and 24 are disconnected each twice from the associated stationary contact points 26 and 28, respectively, as the cam 18 is driven for a full turn about the shaft 20. In other words, each of the movable breaker plates 22 and 24 is disconnected twice from the associated stationary contact point 26 or 28 per two full turns of the output shaft of the engine. When, thus, either or both of the first and second switches 50 and 52, respectively, which are connected in series with each other between the first stationary contact point 26 and ground are open, then the current from the d.c. power source 10 flows through the primary winding 14a of the ignition coil 14 at timings which are in synchronism with the cyclical opening of the first and second movable breaker plates 22 and 24, respectively, or four times per full turn of the cam 18. Each of the spark plugs 44 and 46 of the first and second engine cylinders (not shown) is consequently energized twice from the secondary winding 14b of the ignition coil 14 through the line 38, rotary electrode 34 and stationary electrode 36 or 36' as the cam 18 is driven for a single full rotation. Since, under this condition, the rotary electrode 34 is rotated with the cam 18 for being alternately connected to the angularly spaced stationary electrodes 36 and 36' as previously mentioned, the spark plugs 44 and 46 of the first and second engine cylinders are successively energized each one time through the associated stationary electrodes 36 and 36' as the cam 18 is rotated with its cam lobes 18a and 18b successively brought into engagement with the cam follower element 22a of the first movable breaker plate 22 and further as the cam 18 is rotated to have its cam lobes 18a and 18b brought into engagement with the cam follower element 24a of the second movable breaker plate 24. The combustible mixtures in the two engine cylinders are in this manner properly ignited and combusted during the consecutive two combustion strokes of each cylinder insofar as the first and/or second switches 50 and/or 52, respectively, are open.

When, now, both of the first and second switches 50 and 52, respectively, are closed in response to the conditions in which the degree of opening of the carburetor throttle valve 56 is smaller than the predetermined value and simultaneously the engine speed is higher than the predetermined limit of, for example, about 1,200 rpm, the first stationary contact point 26 is kept grounded through the line 48 and the switches 50 and 52. Under this condition, the second movable breaker plate 24 is disabled to lend itself to the actuation of the secondary winding 14b of the ignition coil 14 because the breaker plate 24 is constantly connected to the ground. The spark plugs 44 and 46 of the first and second engine cylinders, respectively, are accordingly energized from the secondary winding 14b of the ignition coil 14 as the cam 18 is rotated to have its cam lobes 18a and 18b brought into contact with the cam follower element 22a of the first movable breaker plate 22. The spark plugs 44 and 46 are kept de-energized even though the second movable breaker plate 24 is disconnected from the second stationary contact point 28 as the cam 18 is further rotated to have the cam lobes 18a and 18b brought into engagement with the cam follower element 24a of the second movable breaker plate 24. Thus, each of the spark plugs 44 and 46 of the first and second engine cylinders, respectively, is energized in response to each full turn of the cam 18 or, in other words, to every second combustion stroke in the engine cylinder. The spark plugs 44 and 46 are accordingly de-energized during every second combustion stroke in the engine cylinders so that the misfiring and firing take place alternately throughout the successive combustion strokes insofar as the first and second switches 50 and 52, respectively, are closed or the engine braking condition are maintained.

FIG. 3 illustrates a modification of the embodiment of the ignition system thus far described. The modified embodiment is made up of parts and elements which are essentially similar to those of the embodiment shown in FIG. 1 and which are accordingly designated by like reference numerals.

Different from the circuit arrangement of the embodiment shown in FIG. 1, the circuit arrangement of the embodiment herein shown is such that the first and second switches 50 and 52, respectively, are connected in parallel across the two sets of movable breaker plates 22 and 24 and stationary contact points 26 and 28. More specifically, the first movable breaker plate 22 and second stationary contact point 28 are constantly grounded and the first stationary contact point 26 is constantly connected to the primary winding 14a of the ignition coil 14 through a line 74 so that, when the first movable breaker plate 22 is in contact with the first stationary contact point 26 depending upon the angular position of the cam 18, the primary winding 14a is connected to ground between a series circuit consisting of the line 74, first stationary contact point 26 and first movable breaker plate 22. The first and second switches 50 and 52 are connected in parallel to the first stationary contact point 26 and to the second movable breaker plate 24.

The switches 50 and 52 are biased to be closed and are caused to open in response to the previously described operational conditions of the engine during the engine braking condition. Thus, the mechanical linkage 60 interconnecting the first switch 50 and the throttle valve 56 of the carburetor 58 is adapted to move the switch 50 to an open position when the throttle valve 56 is conditioned so as to provide a degree of opening smaller than a predetermined value, while the solenoid device 62 associated with the second switch 52 is adapted to be biased to close the switch 52 and to move the same to an open position when the magnetically operated switch 66 is closed by means of the electromagnet 68 in response to an engine speed higher than a predetermined level.

When, now, at least either of the first and second switches 50 and 52, respectively, is closed with the carburetor throttle valve 56 held in an angular position providing a degree of opening larger than the predetermined value and/or the engine operating at a speed lower than the predetermined level, not only the first stationary contact point 26 is constantly connected to the primary winding 14a of the ignition coil 14 but the movable breaker plate 24 is kept connected to the primary winding 14a through the switch 50 and/or switch 52. The primary winding 14a of the ignition coil 14 is consequently connected to ground through the series ground connection consisting of the first stationary contact point 26 and first movable breaker plate 22 or through the ground connection consisting of at least either of the switches 50 and 52, second movable breaker plate 24 and second stationary contact point 28 as the movable breaker plates 22 and 24 are caused to contact the associated stationary contact point 26 and 28 in a manner previously described with reference to FIG. 1. The spark plugs 44 and 46 are accordingly energized four times in total as the cam 18 and rotary electrode 34 are driven each for a single full turn about the shaft 20 so that the movable breaker plates 22 and 24 are disconnected each twice from their associated stationary contact points 26 and 28, respectively, as the angularly spaced cams lobes 18a and 18b are in engagement with the cam followers 22a and 24a of the breaker plates 22 and 24, respectively.

When, however, both of the first and second switches 50 and 52, respectively, are concurrently open in response to a degree of opening smaller than the predetermined value of the carburetor throttle valve 56 and to an engine speed higher than the predetermined level, the connection between the second movable breaker plate 24 and the primary winding 14a of the ignition coil 14 through the first switch 50 and/or second switch 52 is interrupted so that a surge current is produced in the secondary winding 14b of the ignition coil 14 only in response to the cylical disconnection of the first breaker plate 22 from the first contact point 26. The spark plugs 44 and 46 of the first and second engine cylinders, respectively, are accordingly energized from the secondary winding 14b of the ignition coil 14 each one time per full rotation of the cam 18 or each in response to every second combustion stroke in the engine cylinders whereby the firing and misfiring take place in the engine cylinders alternately throughout the successive combustion strokes.

While only two embodiments of the ignition system according to the present invention have been shown and described, it is understood that the same are not limitative of the present invention but are susceptible of numerous changes and modifications as known to a person skilled in the art.

What is claimed is:

1. In an ignition system for a rotary internal combustion engine having two rotary engine units including two ignition plugs carried by the two rotary engine units respectively, and an ignition circuit for said two ignition plugs including two sets of contact points for the two ignition plugs respectively opening at predetermined timing positions for the respective plugs, the improvement wherein said system further comprises means for disabling one of said two set of contact points when said engine operates during engine braking condition.

2. In an ignition system for a rotary internal combustion engine having two rotary engine units including two ignition plugs carried by the two rotary engine units respectively, an ignition circuit for said two ignition plugs including two sets of contact points connected in series with each other and opening at predetermined timing positions for the respective plugs; the improvement comprising a normally open switch circuit for grounding one of said two sets of contact points to disable one of said two sets of contact points when said normally open switching circuit is closed.

3. In an ignition system as claimed in claim 2, in which said normally open switching circuit includes first switch contact points connected in series with said first switch contact points, said first switch contact points being closed when the degree of opening of the engine throttle valve is smaller than a predetermined value, said second switch contact points being closed when the engine revolution speed is above a predetermined value.

4. In an ignition system for a rotary internal combustion engine having two rotary engine units including two ignition plugs carried by the two rotary engine units respectively, an ignition circuit for said two ignition plugs including two sets of contact points, the improvement comprising a normally closed switching circuit connecting said two sets of contacts in parallel with each other for disabling one of said two sets of contact points when said normally closed switching circuit is opened.

5. In an ignition system as claimed in claim 4, in which said normally closed switching circuit includes first switch contact points connecting said two sets of contact points in parallel with each other and second switch contact points connecting said two sets of contact points in parallel with each other, said first switch contact points being opened when the degree of opening of the engine throttle valve is smaller than a predetermined value, said second switch contact points being opened when the engine revolution speed is above a predetermined value.

* * * * *